UNITED STATES PATENT OFFICE.

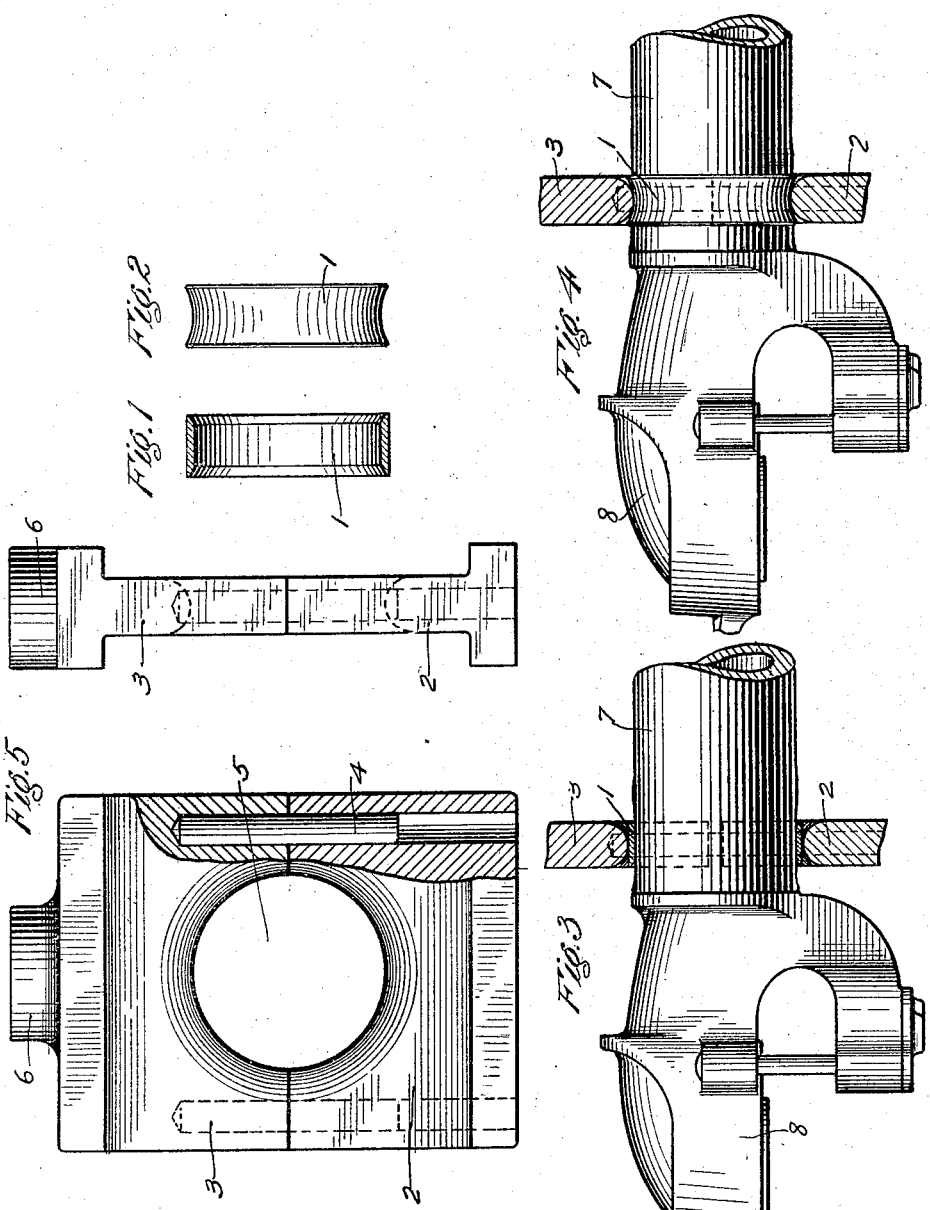

CHARLES A. McKERAHAN, OF WILMERDING, PENNSYLVANIA, ASSIGNOR TO THE WESTINGHOUSE AIR BRAKE COMPANY, OF WILMERDING, PENNSYLVANIA, A CORPORATION OF PENNSYLVANIA.

HOSE-CLAMP.

1,211,466.   Specification of Letters Patent.   Patented Jan. 9, 1917.

Application filed May 14, 1914. Serial No. 838,464.

*To all whom it may concern:*

Be it known that I, CHARLES A. MCKERAHAN, a citizen of the United States, residing at Wilmerding, in the county of Allegheny and State of Pennsylvania, have invented new and useful Improvements in Hose-Clamps, of which the following is a specification.

This invention relates to hose clamps, and more particularly for securing flexible hose to couplings or other connections.

The principal object of my invention is to provide an improved hose clamp which can be cheaply constructed and easily applied and which is adapted to make a tight and permanent joint.

In the accompanying drawing; Figure 1 is a transverse section of a hose clamp band as it appears before crimping; Fig. 2 a side view of a hose clamp band after crimping; Fig. 3 a view of a train line coupling applied to a section of flexible hose with a hose clamp band in place thereon and showing the crimping tool in position for crimping the band; Fig. 4 a similar view, after the crimping tool has been operated to crimp the hose clamp band on to the flexible hose; Fig. 5 a front elevation, partly in section, of a tool for crimping the hose clamp band; and Fig. 6 a side elevation of the crimping tool.

According to my invention, it is proposed to employ an endless band as a hose clamp and after applying the same in position to crimp the same circumferentially so as to lightly press the flexible hose into engagement with the coupling or other metal connection.

As shown in Fig. 1, the hose clamp band may consist of a cylindrical section 1, of suitable width and preferably having its edges chamfered.

Any desired form of crimping tool may be employed, but in the drawing I have shown a simple construction for the purpose comprising two half sections 2 and 3. The lower section 2 is provided with guide pins 4 adapted to register with corresponding holes in the upper section 3 and centrally, the sections are bored out to form a circular opening 5 having half round walls. On the upper section 3 an anvil projection 6 may be provided.

In order to secure the hose clamp in position the band in the shape shown in Fig. 1 is slipped over the flexible hose 7 and the coupling 8 or other connection is then forced into the end of the hose. The hose clamp band so positioned is then applied to the lower section 2 of the crimping tool and the upper section is fitted on to the guide pins 4. The anvil 6 may then be struck with a heavy hammer or sledge so as to deform the hose clamp band and circumferentially crimp the same on to the flexible hose. By crimping the band in this manner, a tight continuous joint is effected between the flexible hose and the coupling or connection and since the band presses at all points in the circumference, there is no liability of leakage or working loose.

Having now described my invention, what I claim as new and desire to secure by Letters Patent, is:

1. The combination with a flexible hose section and a metallic connection inserted therein, of a hose clamp for securing the hose to the metallic connection comprising a narrow cylindrical band having its cross section formed to an arc extending to the free edges of the band after the parts are assembled.

2. The combination with a flexible hose section and a metallic connection inserted therein, of a hose clamp for securing the hose to the metallic connection comprising a narrow cylindrical band having its cross section on an unbroken arc extending to the free edges of the band.

In testimony whereof, I have hereunto set my hand.

CHARLES A. McKERAHAN.

Witnesses:
 GEO. B. SNYDER,
 ALFRED ELLIOTT.

Copies of this patent may be obtained for five cents each, by addressing the "Commissioner of Patents, Washington, D. C."